Feb. 3, 1959 A. S. CUMMIN ET AL 2,872,630
CAPACITOR AND DIELECTRIC MATERIAL THEREFOR
Filed Feb. 8, 1956
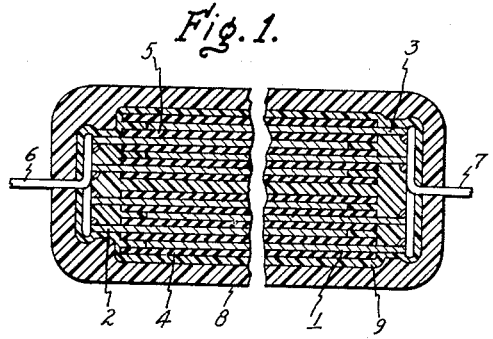
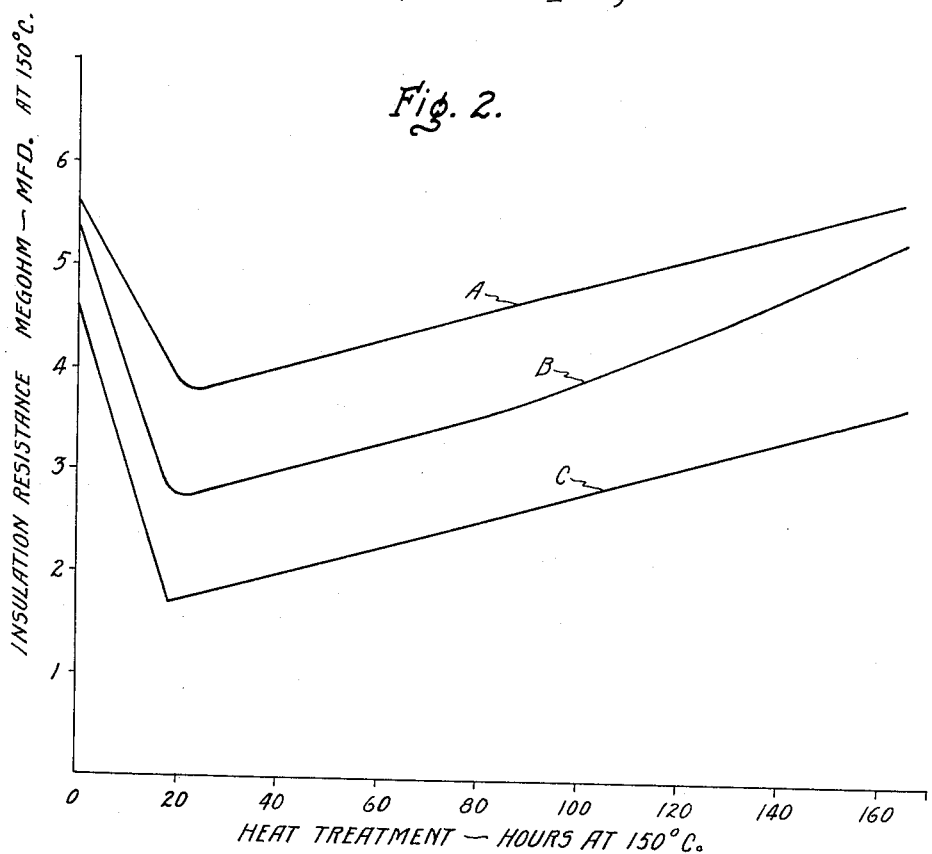
Inventors,
Alfred S. Cummin,
John R. Hutzler,
by Gilbert P. Tarlton
Their Attorney.

United States Patent Office 2,872,630
Patented Feb. 3, 1959

2,872,630

CAPACITOR AND DIELECTRIC MATERIAL THEREFOR

Alfred S. Cummin, Glens Falls, and John R. Hutzler, Fort Edward, N. Y., assignors to General Electric Company, a corporation of New York Application February 8, 1956, Serial No. 564,339

10 Claims. (Cl. 317—258)

The present invention relates to electrical insulating materials and particularly to capacitors and dielectric materials therefor.

It is an object of the invention to provide capacitors having a dielectric material incorporated therein which confers improved electrical and thermal properties on the capacitors.

It is another object of the invention to provide dielectric material for capacitors and other electrical apparatus which is characterized by superior insulation resistance and thermal stability.

It is still another object of the invention to provide capacitors particularly of the molded tubular paper dielectric type incorporating improved dielectric resin material which confers increased insulation resistance, thermal stability and life characteristics thereto even after molding and heat-aging treatments.

Other objects and advantages will become apparent from the following description and appended claims.

Under the increasingly severe operating conditions of high temperature and voltage to which capacitors are presently being subjected, the insulation resistance and thermal stability of the capacitor and its components have become of considerable importance. Insulation resistance has become widely used in the industry as a criterion of the life characteristics of electrical capacitors, since it is known that low insulation resistance contributes to high leakage currents leading to undue shortening of capacitor life. The insulation resistance of capacitors in general tends to decrease under increasing temperature, and it is even more important, therefore, that the dielectric material used in capacitors have a suitably high insulation resistance at elevated temperatures.

A class of synthetic resin materials which has heretofore been found suitable as a dielectric impregnant for capacitors includes the vinyl pyrroles, and particularly N-vinyl carbazole. The latter impregnant provides characteristics of voltage breakdown and life which are substantially better than other dielectric materials used previously as capacitor impregnants.

It has now been found in accordance with the present invention that a dielectric material of even superior properties for use in electrical capacitors may be produced by the copolymerization of a mixture of N-vinyl carbazole and a small amount of divinyl benzene.

The invention will be better understood from the following description taken in conjunction with the accompanying drawing, in which:

Fig. 1 is a longitudinal sectional view of a molded paper dielectric tubular capacitor in which the present invention may be embodied; and Fig. 2 graphically illustrates the improved insulation resistance obtained in molded capacitors in accordance with the present invention even under conditions of elevated temperature.

Referring now to the drawing, and particularly to Fig. 1, there is shown a tubular resin-encapsulated capacitor of the type to which the present invention is applicable, and in which the improved results of increased insulation resistance are especially marked. The capacitor illustrated includes an inner assembly or body 1 composed of a convolutely wound roll of alternately arranged metallic foils or armatures 2, 3 and dielectric spacer sheets 4, 5. The metallic foils 2, 3 may be of any suitable conductive material such as tin or aluminum, and the spacer sheets 4, 5 may be kraft paper. While kraft paper is preferred, other types of spacer material may be used, such as polyethylene terephthalate, polystyrene, polyethylene, or other known dielectric spacer sheet material. The spacer sheets are preferably porous in order to absorb and retain the dielectric liquid impregnant applied thereto, and the dielectric impregnant may form a coating on the sheet as well as impregnate the body of the sheet itself. As shown in the drawing, in addition to permeating the spacer material 4, 5, the impregnant in the form of a coating 9 fills the space between the capacitor roll 1 and the resin casing 8. Foils 2, 3 preferably project in opposite directions beyond dielectric sheets 4, 5 at the opposite ends of the roll, and to the respective foil edges axial leads 6, 7, such as tinned copper wires, are attached by any suitable means, e. g., by soldering or welding.

Casing 8 may be composed of any suitable encapsulating thermoplastic or thermosetting resin, but is preferably a thermosetting resin such as a phenol-formaldehyde condensation product and typically is applied and molded around the impregnated capacitor roll 1 by procedures already known in the art using heat and pressure, so as to completely encase and seal the capacitor roll. Other specific types of thermo-setting molding compounds which may be used are melamine-formaldehyde, urea-formaldehyde and epoxy resins.

Examples of suitable thermoplastic molding compounds are polystyrene, polyethylene, acrylates and polytetrafluoroethylene. The molding material may also contain filling material as is known in the art, such as mineral or fibrous fillers. The encapsulation may be carried out by various molding processes, compression molding, for example, with or without heat being ordinarily used for the thermosetting resins, and injection molding usually being employed with the thermoplastic materials and generally with heat. Casting procedures may also be used where appropriate.

In accordance with the invention, the dielectric spacer sheets 4, 5 are impregnated with a synthetic resin composed of a copolymer obtained by polymerizing a mixture of N-vinyl carbazole and divinyl benzene. Normally the liquid mixture of N-vinyl carbazole and divinyl benzene is applied in known manner to the kraft paper sheets and copolymerized in situ with or without a suitable polymerization catalyst, such as tertiary butyl perbenzoate or the various peroxide compounds commonly used as accelerators or catalysts for resin curing.

In a typical process in making a capacitor of the type described, the capacitor section 1 before impregnation of molding is subjected to a vacuum-drying cycle at a temperature of about 130° C. to remove water and other volatile materials, and the section is thereafter impregnated with the liquid dielectric impregnant composed of a mixture of N-vinyl carbazole and divinyl benzene under a vacuum of about 500 microns or less at a temperature of about 100° C. After the capacitor unit is removed from the impregnating tank, the dielectric liquid mixture is polymerized in situ by the application of heat, preferably applied by means of an air-circulating oven wherein the temperature rises slowly from 25° C. to 125° C. The capacitor body after being thus impregnated may then be encapsulated by having molded thereon a jacket of phenol formaldehyde resin such as a two-stage mica-filled phenolic resin molded at pressures of 1,000 to 2,000 pounds per square inch and at temperatures of 290° F.-360° F. The capacitor section having been completely encased in a molded thermosetting resin, it may then be subjected to a heat-aging process as more fully described below, and as disclosed in the copending application of Cummin et al., Serial No. 541,662, filed October 20, 1955, now Patent No. 2,819,492 dated January 14, 1958, and assigned to the same assignee as the present invention.

In general the proportion of divinyl benzene used in preparing the copolymer is about 0.2–10% by weight of the vinyl carbazole used. Concentrations of divinyl benzene below that range will not result in sufficient cross-linking to produce a proper copolymer, while higher concentrations appear to cause undesirable embrittlement of the final product. In a typical commercially available composition there is present a mixture of isomers of divinyl benzene, diethyl benzene and ethyl vinyl benzene, the divinyl benzene being present in such a mixture in an amount of about 50–60% by weight. The materials in the mixture other than divinyl benzene, however, are inert in so far as cross-linking or thermosetting properties are concerned in the present invention.

A typical commercial sample of divinyl benzene has the following composition in percent by weight:

| | Percent |
|---|---|
| Divinyl benzene | 55.0 |
| Ethyl vinyl benzene | 35.4 |
| Diethyl benzene | 9.6 |

Para-tert-butyl-catechol may be present in the above material as an inhibitor in a concentration usually about 1,000 parts per million.

In a series of tests made on non-encapsulated capacitor units prepared with varying proportions of the dielectric ingredients as indicated in the table, the following results in terms of insulation resistance were obtained, the IR values being an average of a plurality of samples of each composition:

Table I

| Impregnant Composition | Insulation Resistance at 125° C., Megohm-Microfarads |
|---|---|
| Polyvinyl carbazole | 45 |
| N-vinyl carbazole+0.6% divinyl benzene | 48 |
| N-vinyl carbazole+0.6% divinyl benzene+0.3% catalyst | 62 |
| N-vinyl carbazole+1.2% divinyl benzene | 54 |
| N-vinyl carbazole+1.2% divinyl benzene+.45% catalyst | 53 |

As will be seen from the above data, the mixtures of N-vinyl carbazole and divinyl benzene in the varying proportions shown all resulted in substantially higher insulation resistance in the capacitor units as compared to those impregnated solely with polyvinyl carbazole. The composition including 0.6% divinyl benzene and .3% catalyst produced, in fact, an insulation resistance about 38% higher than that of the polyvinyl carbazole alone.

An even more marked improvement in insulation resistance characteristics is provided by the present copolymer impregnant in plastic encapsulated capacitor units of the type shown in Fig. 1. The following table shows the results obtained in initial IR values of different vinyl carbazole-divinyl benzene copolymer compositions and a control composition of polyvinyl carbazole alone, the values being an average of three samples of each resin composition:

Table II

| Impregnant Composition | Insulation Resistance at 125° C., Megohm-Microfarads |
|---|---|
| Polyvinyl carbazole | 21 |
| N-vinyl carbazole + 0.6% divinyl benzene | 32 |
| N-vinyl carbazole + 0.6% divinyl benzene + 0.3% catalyst | 30 |
| N-vinyl carbazole + 1.2% divinyl benzene | 26 |

As shown above, the relative improvement exhibited by the N-vinyl carbazole-divinyl benzene copolymer impregnant over the polyvinyl carbazole material was even greater than that in the non-molded units of Table I, the composition having 0.6% divinyl benzene with no catalyst producing an increase in IR of more than 50% over the ordinary polyvinyl carbazole polymer. These results were surprising in view of the effect of lowered IR heretofore generally expected in molded capacitors, which is presumably caused by the copious amounts of water, ammonia, and other decomposition products of the molding compound which diffuse into the capacitor roll during the molding operation.

It has further been found that the improved IR characteristics are maintained and even excelled after heat-aging treatments of the molded capacitor, of the type disclosed in the above-mentioned copending application, as shown in the following tables:

Table III

| Impregnant Composition | Insulation Resistance at 125° C., Megohm-Microfarads |
|---|---|
| Polyvinyl carbazole | 11 |
| N-vinyl carbazole + 0.6% divinyl benzene | 33 |

The above results were obtained after heat-aging the molded units for 115 hours at 125° C. Another group of units were heat-aged for 75 hours at 135° C. and then an additional 172 hours at 145° C., from which the following IR values were obtained:

Table IV

| Impregnant Composition | Insulation Resistance at 145° C., Megohm-Microfarads |
|---|---|
| Polyvinyl carbazole | 6.2 |
| N-vinyl carbazole + 0.6% divinyl benzene | 8.8 |

The above values reflect the generally observed effect of decrease of IR with increased temperature, but it will be noted that the present copolymer impregnant still affords considerable improvement over the polyvinyl carbazole material heretofore favored as an impregnant for high temperature capacitor operation.

Fig. 2 graphically shows the comparative results obtained in molded tubular capacitors subjected to heat-aging at even higher temperatures and measured for IR at 150° C. The units tested were wound tubular capacitors having kraft paper spacer sheets impregnated with various dielectric resin compositions as indicated below. The impregnants were cured at temperatures increasing from 25° C. to 125° C. for 14 hours followed by 52 hours at 125° C. After curing, the units were encapsulated with a molding composition of a mica-filled phenolic resin. Following the molding process, the units were heat-aged for a period of 165 hours at 150° C. In the graph, IR in megohm microfarads measured at 150° C. and 85 volts D. C. at a 1 minute electrification is plotted against the time in hours of heat-aging at 150° C. The curves represent capacitors with different impregnant compositions as follows:

Curve A—N-vinyl carbazole+1.2% divinyl benzene
Curve B—N-vinyl carbazole+0.6% divinyl benzene
Curve C—Polyvinyl carbazole The IR values plotted represent the median values of several samples of each impregnating composition. As is shown by the graph, both copolymer impregnating compositions (Curves A and B) are superior to the polyvinyl carbazole impregnant in terms of insulation resistance at the comparatively elevated temperature of 150° C. not only initially but throughout the heat-aging cycle. The graph further shows that the capacitors with the present copolymer impregnants re-attained their initial IR values after 165 hours and after the characteristic IR drop in the early stages of heat-aging, whereas the capacitors containing the polyvinyl carbazole impregnant were still considerably below their original IR after the same period.

Further comparative tests were made on samples of molded capacitors of which one group had the usual polyvinyl carbazole dielectric impregnant and another group an impregnant of the present divinyl benzene-N-vinyl carbazole copolymer, and wherein both groups had been heat-aged at 145° C. similarly to the above-described heat-aging process. In these tests the insulation resistance of the two groups of capacitors subjected to various temperature levels was measured under 85 volts D. C. at 1 minute electrification. The results showed that throughout the temperature range of 20° C. to 150° C., the capacitors with polyvinyl carbazole impregnant had an average insulation resistance only about half that of the capacitors with the present copolymer impregnant. The improvement in IR values shown by the present capacitors was, in fact, found to be greater the higher the temperature to which the samples were subjected.

The present dielectric material consisting of the copolymer of N-vinyl carbazole and divinyl benzene thus provides for considerable improvement in the electrical characteristics and thermal stability of capacitors in which it is incorporated, and it enables capacitors of the type described to be used under a wide range of operating conditions, particularly at elevated temperature, while still exhibiting excellent life characteristics and superior insulation resistance. The present copolymer impregnant has all of the desirable characteristics of polyvinyl carbazole heretofore utilized in capacitor construction, such as high softening point, resistance to moisture, low power factor, and the ability to impregnate porous spacer sheets such as kraft paper with ease. Further, the dielectric constant and corona starting voltage characteristics of the present copolymer material are likewise as favorable as polyvinyl carbazole alone.

While tubular capacitors of the molded type have been shown and described, the invention is not intended to be limited to such capacitors, since similarly improved properties can be obtained in capacitors which are not resin-encapsulated and in capacitors other than that of the rolled type, such as stacked capacitors.

Further, the invention may find use in devices and embodiments other than capacitors, such as for insulating purposes in other electrical devices including insulated conductors and the like.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A composition of matter comprising the copolymerization product of N-vinyl carbazole and divinyl benzene of about 0.2–10% by weight of the N-vinyl carbazole.

2. A dielectric material comprising the copolymerization product of a mixture of N-vinyl carbazole and 0.2–10% of divinyl benzene by weight of the N-vinyl carbazole.

3. A dielectric sheet material comprising a porous dielectric sheet impregnated with a copolymerized mixture of N-vinyl carbazole and about 0.2–10% of divinyl benzene by weight of the N-vinyl carbazole.

4. A dielectric sheet material comprising kraft paper impregnated with a copolymerized mixture of N-vinyl carbazole and divinyl benzene constituting about 0.2–10% by weight of the N-vinyl carbazole.

5. Electrical apparatus comprising an electrical conductor insulated with a dielectric composition comprising the copolymer of N-vinyl carbazole and about 0.2–10% of divinyl benzene by weight of the N-vinyl carbazole.

6. Electrical apparatus comprising spaced electrical conductors and insulating material arranged therebetween, said insulating material comprising a copolymerized mixture of N-vinyl carbazole and about 0.2–10% of divinyl benzene by weight of the N-vinyl carbazole.

7. An electric capacitor comprising cooperating armatures and dielectric spacer material therebetween, said dielectric spacer material including the copolymerized product of a mixture of N-vinyl carbazole and about 0.2–10% of divinyl benzene by weight of the N-vinyl carbazole.

8. An electric capacitor comprising cooperating armatures, dielectric spacer material between said armatures comprising the copolymerized product of a mixture of N-vinyl carbazole and about 0.2–10% of divinyl benzene by weight of the N-vinyl carbazole, and a molded synthetic resin casing enclosing said armatures and said dielectric spacer material.

9. An electric capacitor comprising cooperating armatures, and dieletric sheet material comprising kraft paper arranged between said armatures, said kraft paper sheet material being impregnated with the copolymerized product of a mixture of N-vinyl carbazole and 0.2–10% of divinyl benzene by weight of the N-vinyl carbazole.

10. An electric capacitor comprising cooperating armatures, dielectric sheet material comprising kraft paper arranged between said armatures, said kraft paper sheet material being impregnated with the copolymerized product of a mixture of N-vinyl carbazole and 0.2–10% of divinyl benzene by weight of the N-vinyl carbazole, and a heat-molded synthetic resin casing enclosing said armatures and impregnated dielectric sheet material.

References Cited in the file of this patent

UNITED STATES PATENTS

| | | |
|---|---|---|
| 2,072,465 | Reppe | Mar. 2, 1937 |
| 2,202,846 | Garvey | June 4, 1940 |
| 2,287,201 | Scott et al. | June 23, 1942 |
| 2,404,220 | D'Alelio | July 16, 1946 |
| 2,414,320 | Miller et al. | Jan. 14, 1947 |
| 2,540,984 | Jackson | Feb. 6, 1951 |
| 2,634,315 | Allison | Apr. 7, 1953 |

OTHER REFERENCES

"Vinyl and Related Polymers" by Schildknecht, pages 656–658, Wiley and Sons Inc., New York, 1952.

UNITED STATES PATENT OFFICE
CERTIFICATE OF CORRECTION

Patent No. 2,872,630　　　　　　　　　　　　　　　　February 3, 1959

Alfred S. Cummin et al.

It is hereby certified that error appears in the printed specification of the above numbered patent requiring correction and that the said Letters Patent should read as corrected below.

Column 2, line 59, for "impregnation of" read -- impregnation or --.

Signed and sealed this 30th day of June 1959.

(SEAL)
Attest:

KARL H. AXLINE
Attesting Officer

ROBERT C. WATSON
Commissioner of Patents